Patented June 10, 1952

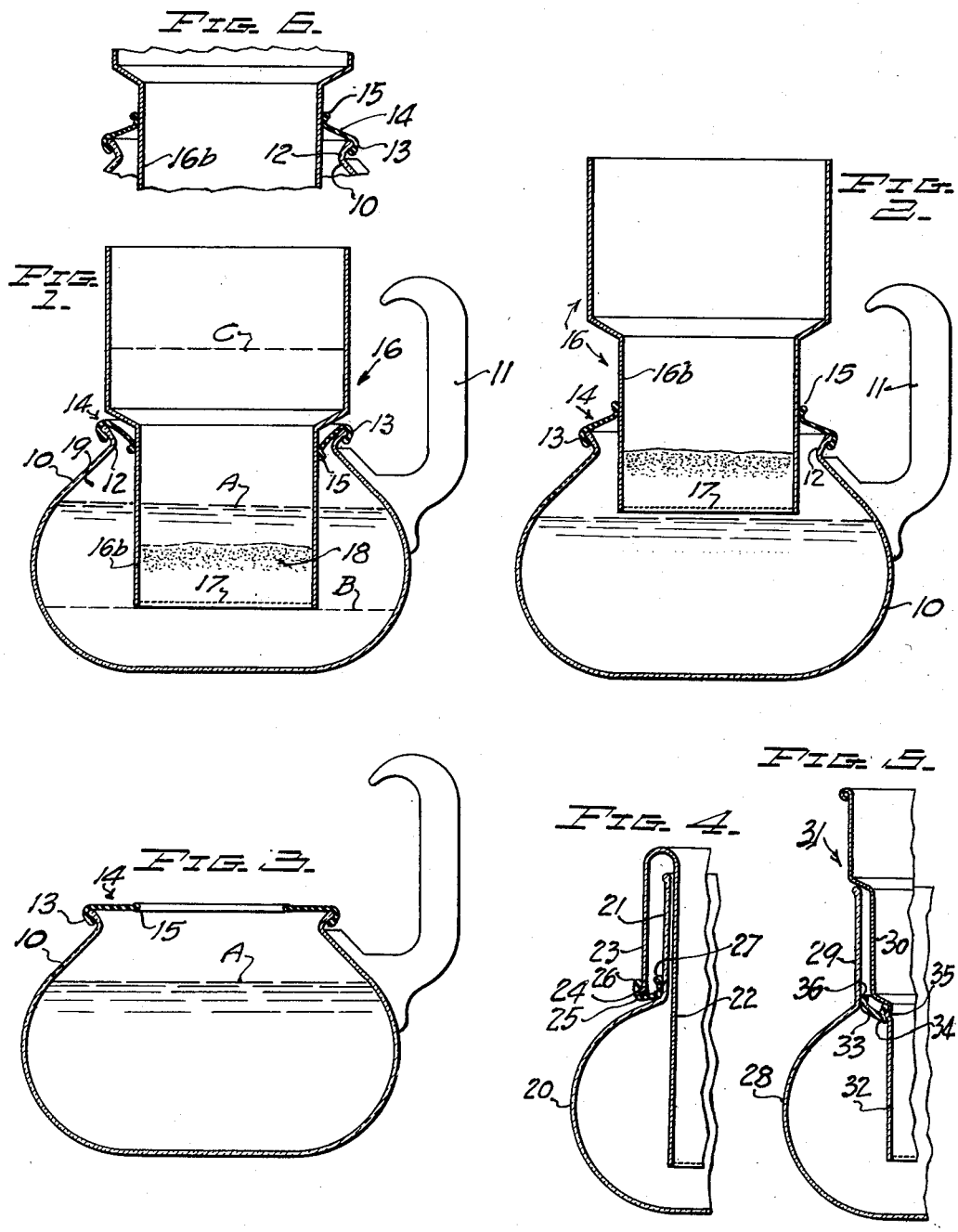
June 10, 1952 — F. N. CRONHOLM — 2,599,812
BREWING APPARATUS
Filed Oct. 5, 1948
Inventor:
FREDRIK N. CRONHOLM
Attorneys.

2,599,812

UNITED STATES PATENT OFFICE 2,599,812

BREWING APPARATUS

Fredrik N. Cronholm, Salt Lake City, Utah

Application October 5, 1948, Serial No. 52,896

8 Claims. (Cl. 99—292)

This invention relates to brewing apparatus of the vacuum type and is particularly well adapted for brewing a beverage such as coffee or tea. It constitutes an improvement upon the device of my co-pending application, Serial No. 721,735 which issued as Patent No. 2,575,260, dated November 15, 1951.

The principal objects of the invention are to provide an apparatus that:

(a) Is operative to definitely draw void moisture from the grounds to the maximum degree.

(b) Is simple, sturdy, and inexpensive to fabricate.

(c) Is easily kept clean and therefore is eminently sanitary.

(d) Has a low center of gravity.

(e) Renders extreme precision of fabrication unnecessary.

Vacuum type coffee makers consisting of a lower vessel or decanter, and a separate upper vessel or grounds container having a restricted tubular dependence that extends into the decanter, are in general well known. In such former constructions, the decanter and the grounds container are sealed to each other by means of a rigid gasket, whereby a vacuum is held in the decanter so long as the two vessels are not moved relative to each other. Therefore, the two vessels cannot be separated, even slightly, if the vacuum is to be maintained.

In the case of the invention, the grounds container is sealed to and suspended in the decanter by means of a flexible, annular, diaphragm which allows great latitude of movement between the two vessels, while at the same time it maintains the desired vacuum in the decanter.

As a result the grounds container may be elevated from its lowermost position to a considerable height without breaking the seal between it and the decanter. This feature makes it possible for the grounds container to exert a piston-like action that prevents the return of void moisture which has previously been expelled from the depleted grounds because of the action of the vacuum following the cooking process.

In practice the diaphragm is made of an elastic, high heat resistant substance, preferably in the form of an annulus. The outer edge portion of the annulus is in sealing contact with a circumferential portion of one vessel, while the inner edge portion of the annulus is in sealing contact with a circumferential portion of the other vessel. This leaves a flexing juncture between the two sealing edge portions.

Preferably one sealing contact is of a frictional nature for the purpose of permitting the diaphragm to slide along a surface of the respective vessel.

In the accompanying drawing, which illustrates several preferred embodiments of the invention, Fig. 1 represents a vertical central section of one embodiment in which the grounds container occupies an initial position in the decanter;

Fig. 2, a section similar to Fig. 1, but showing the grounds container ready for withdrawal;

Fig. 3, a fragmentary section corresponding to Figs. 1 and 2, but showing the decanter and elastic diaphragm as they appear when the grounds container is removed;

Figs. 4 and 5, fragmentary vertical center sections showing alternative embodiments; and Fig. 6, a fragmentary portion of Fig. 1, showing a rolled, alternative position of the grounds container.

Referring to the drawing, Figs. 1 to 3, the numeral 10 indicates a decanter, which contains a liquid such as water, having, for example, the level A, the said decanter being provided with a handle 11. The upper circumferential portion or neck 12 of the decanter 10 is flared outwardly so as to have stretched over it the outer circumferential portion 13 of an annular diaphragm 14, such diaphragm being preferably made of a substance having the requisite flexibility, elasticity and heat resistance. The inner circumferential portion 15 of the annular diaphragm 14 is adapted to receive a grounds container 16, with respect to which latter the circumferential portion 15 is stretched so as to hold the container in various positions such as those illustrated in Figs. 1 and 2.

It is desirable, and one of the features of the invention, that the tension of one of the circumferential portions, in this instance 15, is such that the grounds container, in this instance 16, can be moved into various alternative positions without disturbing the other seal, in this instance the one around the neck of the decanter 10. In other words there are two seals, a major and a minor one, that function to permit movement of the grounds container without breaking either seal until the complete withdrawal of the container from the diaphragm.

Figs. 1 and 2 illustrate alternative positions of the container 16. The transition from the position in Fig. 1 to the position in Fig. 2, or vice versa, can be effected manually. The progress of the transition from one position to the other is substantially a rolling one in which the elastic diaphragm 14 flexes about the inner circumferential portion 15 as a fulcrum while maintaining a tight seal in all positions. The rolling feature is unique and renders it possible to make the height of the decanter decidedly less than would otherwise be the case.

Both the grounds container and the decanter are preferably circular in horizontal cross-section, but other perimeters are not necessarily excluded, since the flexible annular diaphragm connecting the two, accommodates itself accordingly. In any case the bottom of the grounds container is perforate, to serve as a strainer and as a support for the grounds.

In using this brewing apparatus, supposing water to be the liquid, and coffee the material for brewing or steeping. The decanter is filled with water to the level A, Fig. 3, the flexible diaphragm having meanwhile been placed upon the decanter as indicated. Ground coffee 18 is placed in the container 16, and the latter is pushed down into place through the flexible diaphragm, somewhat as indicated in Fig. 1 with the result that the water in the two vessels seeks a common level such as A, Fig. 1. Now, when heat is applied to the decanter, preferably to the bottom thereof, steam is evolved from the water and gradually fills the space around the container 16b, beginning at 19, until the level A finally recedes to the level B or even lower. Meanwhile water has been forced through the strainer 17, rising for illustration to the level C, after having moistened and soaked the ground coffee 18 for essence extraction.

Substantially the level C is maintained so long as the brewing process continues. By reason of the fact that the grounds container is seated on and suspended by the flexible diaphragm the container is in reality in a floating position so that it may readily vibrate upwardly and downwardly. An upward and downward movement is imparted to the grounds container by the spasmodic escape, during the brewing operation, of vapor up through the contents of the grounds container. This up and down movement of the grounds container is rapid, that is like a jiggling motion, and this motion causes an agitation of the grounds within the container and obviates the necessity of manual stirring as is advocated in respect to vacuum coffee makers now known and in use. Due to the fact that the grounds container is not fixed as to elevation, under decanter pressure, as the cooking or brewing process begins, the container is slightly elevated and while in this position begins to pulsate upwardly and downwardly when the liquid in the decanter has reached the evacuation level and vapor begins to escape into the grounds container. After sufficient brewing the heating is discontinued and the resulting condensation of the steam in the space, beginning at 19, around the depending portion 16b, tends to produce a vacuum in that space. This tendency causes the brew to be drained out of the grounds container, and accomplishes a very complete extraction of the coffee essence, leaving the grounds practically dry on the perforate bottom. With the discontinuance of the application of heat the condensation or vacuum period or operation occurs and the floatingly suspended grounds container is forced or pulled downwardly, below the high position it attained during the brewing operation, and the downward movement of the grounds container into the decanter causes it to rest solidly on the portion of the diaphragm which extends over the neck 12 of the decanter.

Upon completion of the brewing operation the grounds container is manually lifted from the decanter. During this movement the parts assume the position illustrated in Fig. 2 of the drawings and during the removal of the grounds container the portion 16b thereof exerts a piston-like action which creates a suction through the grounds. This suction is even greater than the suction of the normal vacuum created during the brewing operation and will extract from the coffee grounds any moisture remaining in them by reason of not having been removed due to the normal vacuum. It is to be noted that until the coffee grounds are lifted above the liquid level in the decanter the seal of the diaphragm with the grounds container is maintained. In fact this seal is maintained until the grounds container is actually completely and entirely above the top of the decanter. The purpose of maintaining the seal is to prevent return of the brew through the perforate bottom while the latter is being raised at least to a point above the liquid level in the decanter. Unless the seal is broken, the body of brew that has risen in the decanter around the grounds container, is held in suspension indefinitely.

Attention is directed to the nature of the seal between the decanter and the grounds container. The position assumed by the diaphragm during the brewing operation is such that the seal is more resistant to pressure within the decanter than it would be were the diaphragm in the position it assumes when the container is being removed from the decanter. Similarly the position assumed by the diaphragm as the container is being removed from the decanter is such as to be more resistant to the vacuum pull than it would be were the diaphragm in the position it assumes during the brewing operation. Consequently during both the brewing and vacuum cycles the seal is automatically positioned to maintain its best sealing relationship with the container.

In the construction of Fig. 4, the decanter 20 has an axially elongated, vertical neck 21, while the grounds container 22 is spaced annularly inward of the neck 21 and has an outwardly depending annular portion 23. The latter has a flaring lip 24 against which a flexible diaphragm 25 maintains the major seal at 26 and the minor seal at 27. Elevating the grounds container 22 causes the diaphragm to roll around the minor seal 27 bringing about an operative action similar to that previously described.

Throughout the various constructions the brewing apparatus of the invention is eminently sanitary, since it is free of any concealed or inaccessible passages in which organic matter can accumulate, such as is the case in other vacuum types where restricted passages lead through depending tubes of various kinds.

In all of the constructions the extensive area of the grounds container bottom makes it possible to set it on end in stable equilibrium. This feature provides a convenience that is not possessed by other vacuum brewers where only a tube of small diameter depends from the bottom of the grounds container.

The flexible diaphragm of the invention renders undue precision not necessary in shaping the contacting surfaces of the decanter or grounds container to the diaphragm. An important feature is that the simplicity of construction facilitates the fabrication of this brewing apparatus of metal as well as of glass. Another feature is that the grounds container embodies a grounds rest, for illustration, the perforate bottom, suspended low in the decanter during brewing, this grounds rest being movable into elevated, self-sustained suspension where the grounds are free of the brewing liquid, as in Fig. 2, such movement taking place without breaking the previously mentioned seals between said container and said decanter.

In moving the grounds container up or down, there is first a normal flexure or rolling of a part of the diaphragm tending to invert the rolling portion, but not to change the position of the circumferential fulcrum along its sealing bearing. Upon continuing the up or down movement, as the case may be, a sliding or translation of the fulcrum takes place along the surface against which it bears. The change in position of the diaphragm in Fig. 1 to that in Fig. 6, is intended to show rolling travel only, while the change from Fig. 1 to Fig. 2, includes a certain amount of sliding travel.

In the construction of Fig. 5, the decanter 28 has the neck 29 spaced apart outwardly and annularly from the wall 30 of a grounds container 31, the latter having the lesser annular, depending wall 32. A flexible diaphragm 33 has its major sealing contact 34 by being stretched over an annular corrugation 35. The minor sealing contact is at 36 against the inner surface of neck 29. Elevating the grounds container 31 causes the diaphragm to fulcrum annularly around the minor seal 36, and being movable along the inner surface of the neck 29, accomplishes a result similar to that previously described.

While this invention is here described and illustrated with respect to certain presently preferred practices and apparatus, various changes may be made therein on the basis of the teachings hereof, by those skilled in the art, without departing from the scope of the following claims.

What is claimed is:

1. Brewing apparatus, comprising a decanter; a grounds container spaced apart inwardly of and depending into the decanter; and an annular flexible diaphragm having an outer sealing circumference tensioned around the outer side of said decanter; an inner sealing circumference tensioned around said grounds container and a substantially neutral thin and extremely flexible sheet-like portion connecting said sealing circumferences together; said diaphragm extending unbrokenly across the space between the decanter and the grounds container.

2. Brewing apparatus, comprising a decanter having an open perimetral portion at the top thereof; a grounds container having a body portion spaced inwardly of said perimetral portion; a freely flexible sheet-like annular diaphragm the outer circumferential portion of which is airtight sealed to said open perimetral portion, the inner circumferential portion of which is airtight sealed to said body portion; that portion of the diaphragm disposed between the grounds container body and the decanter being freely movable upwardly and downwardly, said diaphragm supporting the grounds container for piston-like movement in respect to the decanter.

3. In a vacuum type brewing apparatus, a liquid carrying decanter having an open upper end, a grounds container extending loosely downwardly through the upper end of the decanter and having a perforate lower end constituting a grounds rest, a thin sheet-like and extremely flexible resilient diaphragm frictionally engaging the decanter and the grounds container, the diaphragm closing and sealing the space between said members and that portion of the diaphragm between the members being free to move upwardly and downwardly and flexibly supporting the grounds container for upward and downward movement in respect to the decanter, the grounds container being manually vertically movable in the diaphragm for insertion into and removal from the decanter, and the sealed relationship of the diaphragm and grounds container upon upward movement of the container for removal from the decanter being maintained unbroken until the grounds rest is above the liquid level in the decanter.

4. In a vacuum type brewing apparatus, a liquid carrying decanter having an open upper end, a grounds container extending loosely downwardly through the upper end of the decanter and having a perforate lower end constituting a grounds rest, a thin sheet-like and extremely flexible resilient diaphragm frictionally engaging the decanter and the grounds container, the diaphragm closing and sealing the space between said members and that portion of the diaphragm between the members being free to move upwardly and downwardly and flexibly supporting the grounds container for an upward and downward pulsating movement of the container in respect to the decanter during the brewing operation, the grounds container being manually vertically slidable in the diaphragm for insertion into and removal from the container, the sealed relationship of the diaphragm and the grounds container upon upward movement of the container for removal from the decanter being maintained unbroken until the grounds rest is above the liquid level in the decanter, and the said upward movement of the container through the diaphragm causing a vacuum pull to be exerted upon the contents of the grounds container.

5. In a vacuum type brewing apparatus, a liquid carrying decanter having an open upper end, a grounds container extending loosely downwardly through the upper end of the decanter and having a perforate lower end constituting a grounds rest, a thin sheet-like and extremely flexible resilient diaphragm frictionally engaging the decanter and the grounds container, the diaphragm closing and sealing the space between said members and flexibly supporting the grounds container, the grounds container being manually vertically movable in the diaphragm for insertion into and removal from the decanter, the diaphragm extending downwardly and inwardly from the decanter to the grounds container during the brewing operation, and the diaphragm extending upwardly and inwardly from the decanter to the grounds container during the manual removal of the container from the decanter.

6. In a vacuum type brewing apparatus, a liquid carrying decanter having an open upper end, a grounds container extending loosely downwardly through the upper end of the decanter and having a perforate lower end constituting a grounds rest, a thin sheet-like and extremely flexible diaphragm composed of a resilient material, said diaphragm being in the form of a ring the outer periphery of which has resilient clamping engagement with the open upper end of the decanter, the opening in the diaphragm having engagement under tension with the grounds container, the diaphragm closing and sealing the space between upper end of the decanter and the grounds container, the grounds container being manually vertically movable in the opening of the diaphragm to permit insertion and removal of the container from the decanter, and during the insertion and removal of the grounds container the edge of the diaphragm defining the opening therein rolling along the grounds container and maintaining its seal therewith unbroken.

7. In a vacuum type brewing apparatus, a liquid container having at its upper end an elongated neck having an open upper end, a grounds container extending loosely downwardly through the neck of the decanter and having a perforate lower end constituting a grounds rest, the upper end of the container loosely telescopically receiving the neck of the decanter, a thin sheet-like and extremely flexible resilient diaphragm in the form of a ring, the outer peripheral edge of the diaphragm resiliently engaging the upper end of the grounds container, the opening in the diaphragm engaging about the neck of the decanter under resilient tension, and the peripheral edge defining the opening in the diaphragm rollable along the neck of the decanter to permit insertion and removal of the grounds container in respect to the decanter.

8. In a vacuum type brewing apparatus, a liquid carrying decanter having an open upper end defined by a surrounding neck, a grounds container extending loosely downwardly through the neck of the decanter and having a perforate lower end constituting a grounds rest, a thin sheet-like and extremely flexible resilient diaphragm in the form of a ring, the edge defining the opening in the diaphragm engaging about the grounds container under tight resilient tension the peripheral edge of the diaphragm resiliently engaging the inner face of the neck of the decanter, and the peripheral edge of the diaphragm rollable along the length of the decanter neck to permit insertion and removal of the grounds container in respect to the decanter.

FREDRIK N. CRONHOLM.

REFERENCES CITED

The following references are of record in the file of this patent:

UNITED STATES PATENTS

| Number | Name | Date |
|---|---|---|
| 376,319 | Lane | Jan. 10, 1888 |
| 598,447 | Spencer | Feb. 1, 1898 |
| 670,004 | Normile | Mar. 19, 1901 |
| 1,365,185 | Nicholls | Jan. 11, 1921 |
| 2,135,543 | Taxay | Nov. 8, 1938 |
| 2,232,614 | Kopf | Feb. 18, 1941 |
| 2,265,615 | Statler | Dec. 9, 1941 |
| 2,321,411 | Morse | June 8, 1943 |
| 2,470,323 | Smith | May 17, 1949 |